US012731729B1

(12) United States Patent
Lau et al.

(10) Patent No.: US 12,731,729 B1

(45) Date of Patent: Sep. 8, 2026

(54) INTEGRATED INDUCTIVE CHARGING FOR WEARABLE DEVICES

(71) Applicant: Sesame AI, Inc., Los Angeles, CA (US)

(72) Inventors: Brian Scott Lau, Bellevue, WA (US); Matthew DeVoe, Bellevue, WA (US)

(73) Assignees: Brian Lau, Bellevue, WA (US); Matthew DeVoe, Bellevue, WA (US); Sesame AI, Inc., Los Angeles, CA (US)

( * ) Notice: Subject to any disclaimer, the term of this patent is extended or adjusted under 35 U.S.C. 154(b) by 0 days.

(21) Appl. No.: 19/336,095

(22) Filed: Sep. 22, 2025

(51) Int. Cl.

| | |
|---|---|
| ***H02J 7/00*** | (2026.01) |
| ***G06F 1/16*** | (2006.01) |
| ***H01F 38/14*** | (2006.01) |
| ***H02J 50/10*** | (2016.01) |

(52) U.S. Cl.
CPC ............. *H01F 38/14* (2013.01); *G06F 1/163* (2013.01); *H02J 50/10* (2016.02)

(58) Field of Classification Search
CPC ........... H01F 38/14; G06F 1/163; H02J 50/10
USPC ........................................... 320/108; 307/104
See application file for complete search history.

(56) References Cited

U.S. PATENT DOCUMENTS

| | | | | |
|---|---|---|---|---|
| 9,590,449 | B2 | 3/2017 | Tilvis et al. | |
| 10,496,131 | B2 | 12/2019 | von Badinski et al. | |
| 12,328,581 | B1 * | 6/2025 | Mars | G06F 1/163 |
| 2022/0255360 | A1 | 8/2022 | Sengupta et al. | |
| 2023/0148716 | A1 | 5/2023 | Zhou et al. | |
| 2023/0205170 | A1 * | 6/2023 | Sanchez | G05B 19/4099 700/98 |
| 2023/0231312 | A1 | 7/2023 | Wang | |
| 2023/0283090 | A1 | 9/2023 | Yoon et al. | |
| 2023/0376072 | A1 * | 11/2023 | von Badinski | G08B 21/02 |
| 2023/0389870 | A1 * | 12/2023 | Watts | A61B 5/6802 |
| 2024/0000206 | A1 * | 1/2024 | Doval | A44C 9/0092 |
| 2024/0081012 | A1 * | 3/2024 | Haverinen | A61B 5/6826 |
| 2024/0266852 | A1 * | 8/2024 | Uusitalo | H02J 50/90 |
| 2024/0291300 | A1 * | 8/2024 | Haverinen | H01Q 1/273 |

FOREIGN PATENT DOCUMENTS

| | | |
|---|---|---|
| WO | 2022085949 | 4/2022 |

OTHER PUBLICATIONS

Bekathwia, "Oura Ring Teardown (Gen 3 and 2)," Digikey.com, Maker,io Powered by Digi-Key, https://www.digikey.it/en/maker/projects/oura-ring-teardown-gen-3-and-2/2c005e01f82d429398e78/49591793cc?srsltid=AfmBOopt9eaXNLkD6UliyyceHII9oHy1iwb9Ws_4c3CJfFwZ0W_kHmF5, Apr. 17, 2022, pp. 1-3.

* cited by examiner

*Primary Examiner* — Zixuan Zhou
(74) *Attorney, Agent, or Firm* — SoCal IP Law Group LLP; Jonathan Pearce

(57) ABSTRACT

There is disclosed a wearable device that includes two bands, an exterior band, and an interior band, comprised of an electrically conductive material, and including at least one interior cut through the entirety of the interior band. The two bands form a single-turn coil from the exterior band that may thereafter be used as a receiving coil for inductive charging.

19 Claims, 10 Drawing Sheets

© 2025 Sesame AI, Inc.

© 2025 Sesame AI, Inc.

© 2025 Sesame AI, Inc.

© 2025 Sesame AI, Inc.

© 2025 Sesame AI, Inc.

© 2025 Sesame AI, Inc.

© 2025 Sesame AI, Inc.

© 2025 Sesame AI, Inc.

© 2025 Sesame AI, Inc.

© 2025 Sesame AI, Inc.

© 2025 Sesame AI, Inc.

INTEGRATED INDUCTIVE CHARGING FOR WEARABLE DEVICES

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to charging of wearable devices and, more particularly, to a system for charging ring-based and similarly-sized wearable device.

Description of the Related Art

Wearable devices have existed in some form since the 1980s. The earliest, mass market wearable device may be the Sony® Walkman® personal tape player or perhaps hearing aids of various forms. These earliest devices relied upon batteries that were simply replaced as their charge was dissipated. Obviously, such replaceable batteries have implications for generating potentially-toxic waste in landfills, and generally being expensive to constantly replace.

Accordingly, and for the last ten to twenty years, most recent wearable devices rely upon internal, rechargeable batteries. As these devices shrink in size, enabling them to be charged in a convenient fashion for users has grown increasingly difficult. Ring-sized devices initially incorporated a plurality (usually two) of terminals for connecting these devices to a charging cable. These types of connections were common, and remain common, in wearable devices like smart watches. These types of connections take up a good deal of space, relative to the size of a ring-sized wearable, and require a user to affirmatively connect the terminals to the charging cable or dock for charging in a specific, particular manner. Accordingly, the user experience is less-than ideal.

Apple® and other manufacturers have popularized inductive charging, initially in mobile telephones and similar devices and expanding into other devices like headphones (e.g. the Airpods®) or the Apple® Watch. Other manufacturers, even those that popularized inductive charging more generally such as those involved in the Qi® inductive charging popularized by the Wireless Power Consortium, have encouraged the use of wireless charging.

Such inductive charging generally functions by inducing an electromagnetic field from a transmitting wire coil in a charging stand or base to a receiving wire coil in a device to be charged. The magnetic field is induced through the transmitting wire coil and through the receiving wire coil, thereby inducing (hence, inductive charging) a current in the wires of the receiving coil, moving through those wires which can be captured and stored in batteries. The receiving wire coil is connected to a charge control subsystem (usually a small SoC) that manages the charging process, dissipating excess current as heat and overall insuring a safe charging process. In more complex systems used now, a short-range wireless communications protocol may be used between control chips of the transmitting coil and the receiving coil to negotiate an appropriate or a maximum transmission speed for the electricity generating the electromagnetic field to thereby match the capabilities of the charger with the receiving device. As a charge proceeds, this process may taper down that powerful charge to better care for the associated batteries through a slow finish to the charging process.

In the context of a small wearable device such as a ring, inductive charging has only just been introduced in the last several years. One significant difficulty is where to place a suitable receiving coil in such a small footprint. Further complicating the matter, the ring itself is typically, and desirably, made of a metal that generally will interfere with the generation of an electromagnetic field and/or conduct any electrical current generated in the absence of suitable shielding.

In response, manufacturers of ring-sized wearable devices have incorporated tiny inductive charging coils, typically within the interior of the ring-sized wearables. The interiors already typically are made of plastic, epoxy or a similar plastic material which does not interfere with the electromagnetic charge. More-recently, some manufacturers have relied upon Aluminum or Titanium or other substantially non-magnetic metals in their interiors. These materials are sufficiently non-reactive to magnetism that their use "over" the wire coils do not dramatically interfere with electromagnetic inductive charging. These ring-sized devices usually rely upon a locating peg which includes specific indentations which correspond to outward protrusions within the interior of the ring-sized device. These counterpart elements assist in lining up the ring-sized device on a charging brick, dock, or stand. As a result the transmitting and receiving wireless coils are aligned for suitable charging. This is, likewise, a marginally less-ideal charging system as the ring will not easily sit on the stand for charging except in a particular rotation and position.

Figure 1:
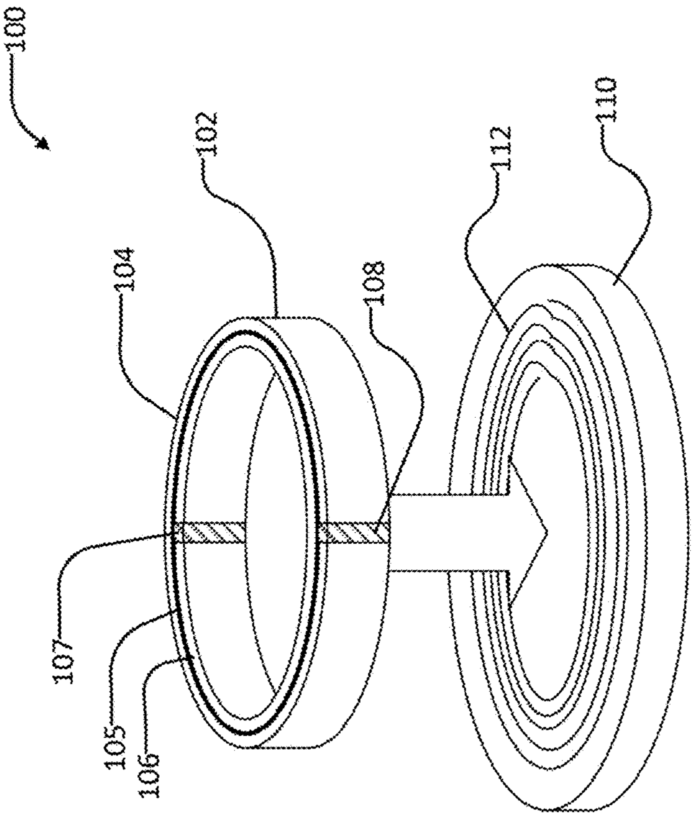
FIG. 1 is a wireless charging system for a wearable device with the wearable device being placed upon a charging dock.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

NON-LIMITING ASPECTS OF THE DISCLOSURE

The following clauses form non-limiting aspects of the present disclosure.

1. A wearable electronic device charging system comprising a wearable device in the form of a ring, the ring comprising:
   an exterior band, comprised of an electrically conductive material, and including one exterior cut through the entirety of the exterior band;
   an interior band, comprised of a plurality of thinner bands stacked one atop another, each one of the plurality of thinner bands formed of an electrically conductive material, with non-conductive material arranged between each, and each including one interior cut through the entirety of each one of the plurality of thinner bands and electrically conductive material joining each of the plurality of thinner bands to thereby form a multi-turn coil;
   a non-conductive material electrically isolating the exterior band from the interior band and joining the exterior band and interior band to thereby form the ring.
2. The wearable electronic device charging system of clause 1 further comprising:
   a charging dock incorporating a transmitting coil for inducing an electromagnetic field for inductive charging of the wearable device.
3. The wearable electronic device charging system of clause 2 wherein the charging dock further comprises an alignment peg over which the ring may be placed to position the ring above the transmitting coil to enable the inductive charging of the wearable device to take place.
4. The wearable electronic device charging system of clauses 2 or 3 wherein the inductive charging substantially conforms to the near field communications wireless charging specification.
5. The wearable electronic device charging system of clause 1 wherein a plurality of turn coils are formed from the plurality of thinner bands by joining each one of the thinner bands at a first side of the thinner band interior cut to a subsequent one of the plurality of thinner bands interior cut opposite the first side with a conductive material, and joining a second side of each one of the thinner bands at the interior cut to the subsequent one of the plurality of thinner bands at a side opposite the second side with a conductive material.
6. The wearable electronic device charging system of clause 1 or clause 5 wherein the exterior band and the interior band are joined to form an additional turn coil by joining a first side of the exterior band at the one exterior cut to the interior cut at a side opposite the first side with a conductive material, and joining a second side of the exterior band at the at least one exterior cut to the interior cut at a side opposite the second side with a conductive material.
7. A wearable device comprising:
   an exterior ring, comprised of an electrically conductive material, and including an exterior cut through the entirety of the exterior ring to thereby form a coil for electromagnetic, inductive charging;
   an interior ring, comprised of an electrically conductive material, and including at least one interior cut through the entirety of the interior ring; and
   the exterior ring and interior ring joined and separated from one another by a non-conductive material.
8. The wearable device of clause 7 wherein the coil may interact with an electromagnetic field to enable inductive charging of a battery housed within the wearable device.
9. The wearable device of any one of clauses 7-8 wherein the exterior ring is joined to a charge controller and the battery to receive an electromagnetic inductive current through the center of the wearable device and to thereby direct charging of the battery under the control of the charge controller.
10. The wearable device of any one of clauses 7-9 wherein the inductive charging substantially conforms to the near field communications wireless charging specification.
11. The wearable device of clause 7 wherein the at least one interior cut is a selected one of:
    one interior cut;
    two interior cuts;
    three interior cuts; and
    four interior cuts.
12. The wearable device of any one of clauses 7-11 wherein the at least one interior cut is designed to reduce induced current circulation and inadvertent generation of a magnetic field contrary to a field used for the electromagnetic inductive charging.
13. A wearable device comprising:
    an exterior band having an exterior cut through the entirety of the exterior band;
    an interior band, having least one interior cut through the entirety of the interior band; and
    the exterior band and interior bands are joined and separated from one another by a non-conductive material.
14. The wearable device of clause 13 wherein the exterior band is comprised of an electrically conductive material.
15. The wearable device of clause 13 wherein the interior band is comprised of an electrically conductive material.
16. The wearable device of any one of clauses 13-15 wherein the exterior band forms a coil for electromagnetic, inductive charging.
17. The wearable device of clause 16 wherein the coil may interact with an electromagnetic field to enable inductive charging of a battery housed within the wearable device.
18. The wearable device of clause 16 or clause 17 wherein the exterior band is joined to a charge controller and the battery to receive an electromagnetic inductive current through the center of the wearable device and to thereby direct charging of the battery under the control of the charge controller.
19. The wearable device of clause 18 wherein the inductive charging substantially conforms to the near field communications wireless charging specification.

20. The wearable device of clause 13 wherein the at least one interior cut is a selected one of:
 one interior cut;
 two interior cuts;
 three interior cuts; and
 four interior cuts.
21. The wearable device of any of clauses 13-20 wherein the at least one interior cut is designed to reduce induced current circulation and inadvertent generation of a magnetic field contrary to a field used for the electromagnetic, inductive charging.
22. A wearable device comprising:
 a truncated band, comprised of an electrically conductive material having a first end and a second end;
 a second truncated band, comprised of an electrically conductive material, having a first end and a second end; and
 wherein the truncated band and the second truncated band are joined and separated from one another by a non-conductive material.
23. The wearable device of clause 22 forming a two-turn coil from the truncated band and the second truncated band by joining the first end of the truncated band to the second end of the second truncated band at a side opposite the first end of the truncated band with a conductive material, and joining the second end of the truncated band to the second side of the second truncated band at a side opposite the second end of the truncated band with a conductive material.
24. The wearable device of clause 23 wherein the two-turn coil may interact with electromagnetic fields to enable inductive charging of a battery within the wearable device.
25. The wearable device of clause 24 wherein the inductive charging substantially conforms to the near field communications wireless charging specification.
26. A wearable electronic device charging system of any of clauses 22-25 comprising a wearable device in the form of a ring, the ring comprising:
 a truncated band, comprised of an electrically conductive material having a first end and a second end;
 an interior band, comprised of an electrically conductive material, and including at least one interior bisecting the interior band; and
 a non-conductive material electrically isolating the truncated band from the interior band and joining the truncated band and interior band to thereby form the ring.
27. The wearable electronic device charging system of clause 26 further comprising:
 a charging dock incorporating a transmitting coil for inducing an electromagnetic field for inductive charging of the wearable device.
28. The wearable electronic device charging system of clause 27 wherein the charging dock further comprises an alignment peg over which the ring may be placed to position the ring above the transmitting coil to enable the inductive charging of the wearable device to take place.
29. The wearable electronic device charging system of clause 28 wherein the inductive charging substantially conforms to the near field communications wireless charging specification.
30. The wearable electronic device charging system of any of clauses 26-29 wherein the at least one interior cut is a selected one of:
 one interior cut;
 two interior cuts;
 three interior cuts; and
 four interior cuts.

31. The wearable electronic device charging system of any of clauses 26-30 wherein the at least one interior cut is designed to reduce induced current circulation and inadvertent generation of a magnetic field contrary to a field used for the electromagnetic, inductive charging.
32. A wearable device comprising:
 an exterior band, comprised of an electrically conductive material, and including at least one exterior cut through the entirety of the exterior band;
 an interior band, comprised of an electrically conductive material, and including one interior cut through the entirety of the interior band to thereby form a coil for electromagnetic, inductive charging; and
 the exterior band and interior band joined and separated from one another by a non-conductive material.
33. The wearable device of clause 32 wherein the coil may interact with an electromagnetic field to enable inductive charging of a battery housed within the wearable device.
34. The wearable device of any of clauses 32-33 wherein the interior band is joined to a charge controller and the battery to receive an electromagnetic inductive current through the center of the wearable device and to thereby direct charging of the battery under the control of the charge controller.
35. The wearable device of any of clauses 32-34 wherein the inductive charging substantially conforms to the near field communications wireless charging specification.
36. The wearable device of any of clauses 32-35 wherein the at least one exterior cut is a selected one of:
 one exterior cut;
 two exterior cuts;
 three exterior cuts; and
 four exterior cuts.
37. The wearable device of any of clauses 32-36 wherein the at least one exterior cut is designed to reduce induced current circulation and inadvertent generation of a magnetic field contrary to a field used for the electromagnetic, inductive charging.
38. A wearable device comprising:
 a first band, comprised of an electrically conductive material, and including a first cut that bisects the first band;
 a second band, comprised of an electrically conductive material, and including at least one second cut through that bisects the second band; and
 forming a two-turn coil from the first band and the interior band by joining a first side of the first band at the at least one first cut to the second cut at a side opposite the first side with a conductive material, and joining a second side of the first band at the at least one first cut to the second cut at a side opposite the second side with a conductive material.
39. The wearable device of clause 38 wherein the first band and the second band are joined and separated from one another by a non-conductive material.
40. The wearable device of any of clauses 38-39 wherein the coil may interact with electromagnetic fields to enable inductive charging of a battery within the wearable device.

41. The wearable device of any of clauses 38-40 wherein the inductive charging substantially conforms to the near field communications wireless charging specification.

42. The wearable device of any of clauses 38-41 wherein the at least one second cut is a selected one of:
one second cut;
two second cuts;
three second cuts; and
four second cuts.

43. The wearable device of any of clauses 38-42 wherein each of the at least one second cut is designed to reduce induced current circulation and inadvertent generation of a magnetic field contrary to a field used for inductive charging.

44. A wearable electronic device charging system comprising a wearable device in the form of a ring, the ring comprising:
a truncated band, comprised of an electrically conductive material having a first end and a second end;
a second truncated band, comprised of an electrically conductive material, having a first end and a second end;
the truncated band and the second truncated band are joined and separated from one another by a non-conductive material; and
a two-turn coil formed from the truncated band and the second truncated band by joining the first end of the truncated band to the second end of the second truncated band at a side opposite the first end of the truncated band with a conductive material, and joining the second end of the truncated band to the second side of the second truncated band at a side opposite the second end of the truncated band with a conductive material.

45. The wearable device of clause 44 wherein the two-turn coil may interact with electromagnetic fields to enable inductive charging of a battery within the wearable device.

46. The wearable electronic device charging system of any of clauses 44-45 further comprising:
a charging dock incorporating a transmitting coil for inducing an electromagnetic field for inductive charging of the wearable device.

47. The wearable electronic device charging system of any of clauses 44-46 wherein the charging dock further comprises an alignment peg over which the ring may be placed to position the ring above the transmitting coil to enable the inductive charging of the wearable device to take place.

48. The wearable electronic device charging system of clause 47 or clause 48 wherein the inductive charging substantially conforms to the near field communications wireless charging specification.

49. A method for making a wearable device in the form of a ring capable of inductive charging using its exterior band as a single-turn inductive charging coil, the method comprising:
form an exterior band and an interior band, suitable to be joined together to form the ring;
incorporating a cut in one of the interior or exterior band so as to create a single-turn inductive charging coil;
incorporating at least one cut in the other of the interior or exterior band so as to reduce induced contrary magnetic currents that may reduce inductive charging efficiency;
join each of the two ends of the single-turn inductive charging coil to charging components for charging a battery; and
join the exterior band and the interior band using a non-conductive material, including non-conductive material filling the gap created by the cut and the at least one cut.

50. The method of clause 49 wherein the joining of each of the two ends of the single-turn inductive charging coil to charging components for charging a battery comprises connecting one of the two ends to a positive terminal and another of the two ends to a negative terminal, both in electrical communication with a charge controller within the ring that provides power to the battery within the ring.

51. The method of any of clauses 49-50 wherein the charge controller substantially conforms to the near field communications wireless charging specification.

52. A method for making a charging dock for charging a wearable device in the form of a ring capable of inductive charging using its exterior band as a single-turn inductive charging coil, the method comprising:
placing a transmitting coil within a base mold;
conductively connect the transmitting coil to a wireless charging transmitter circuit; and
form a body for the charging dock around the transmitting coil and wireless charging transmitter circuit.

53. The method of clause 52 further comprising:
integrating a locating peg into the body of the charging dock which is suitable for the ring to encircle while charging.

54. The method of clause 53 further comprising:
integrating a high permeability core of metal within the locating peg to increase the throughput and efficiency of the charging.

55. The method of any of clauses 52-54 wherein the charge controller substantially conforms to the near field communications wireless charging specification.

56. A wearable device comprising:
an exterior band, comprised of an electrically conductive material, and including at least one exterior cut through the entirety of the exterior band to thereby form a coil for electromagnetic, inductive charging;
an interior band, comprised of an electrically conductive material, and including at least one interior cut through the entirety of the interior band; and
the exterior band and interior band joined and separated from one another by a non-conductive material.

57. The wearable device of clause 56 wherein the coil may interact with an electromagnetic field to enable inductive charging of a battery housed within the wearable device.

58. The wearable device of clause 57 wherein the exterior band is joined to a charge controller and the battery to receive an electromagnetic inductive current through the center of the wearable device and to thereby control charging of the battery under the direction of the charge controller.

59. The wearable device of clause 57 wherein the inductive charging substantially conforms to the near field communications wireless charging specification.

60. The wearable device of any of clauses 56-59 wherein the at least one interior cut is a selected one of:
one interior cut;
two interior cuts;
three interior cuts; and
four interior cuts.

61. The wearable device of any of clauses 56-60 wherein the at least one interior cut is designed to reduce induced current circulation and inadvertent generation of a magnetic field contrary to a field used for the electromagnetic, inductive charging.
62. A wearable device comprising:
    an exterior band, comprised of an electrically conductive material, and including one exterior cut through the entirety of the exterior band;
    an interior band, comprised of an electrically conductive material, and including one interior cut through the entirety of the interior band; and
    forming a two-turn coil from the exterior band and the interior band by joining a first side of the exterior band at the at least one exterior cut to the interior cut at a side opposite the first side with a conductive material, and joining a second side of the exterior band at the at least one exterior cut to the interior cut at a side opposite the second side with a conductive material.
63. The wearable device of clause 62 wherein the exterior band and the interior band are joined and separated from one another by a non-conductive material.
64. The wearable device of any of clauses 62-63 wherein the two-turn coil may interact with electromagnetic fields to enable inductive charging of a battery within the wearable device.
65. The wearable device of clause 64 wherein the inductive charging substantially conforms to the near field communications wireless charging specification.
66. The wearable device of any of clauses 62-65 wherein the wearable device is a ring.
67. The wearable device of any of clauses 62-66 wherein the interior cut and the exterior cut are aligned along an axis extending radially outward from a center of the circle formed by the ring.
68. A wearable electronic device charging system comprising a wearable device in the form of a ring, the ring comprising:
    an exterior band, comprised of an electrically conductive material, and including one exterior cut through the entirety of the exterior band;
    an interior band, comprised of an electrically conductive material, and including at least one interior cut through the entirety of the interior band;
    a non-conductive material electrically isolating the exterior band from the interior band and joining the exterior band and interior band to thereby form the ring.
69. The wearable electronic device charging system of clause 68 further comprising:
    a charging dock incorporating a transmitting coil for inducing an electromagnetic field for inductive charging of the wearable device.
70. The wearable electronic device charging system of clause 69 wherein the charging dock further comprises an alignment peg over which the ring may be placed to position the ring above the transmitting coil to enable the inductive charging of the wearable device to take place.
71. The wearable electronic device charging system of clause 70 wherein the inductive charging substantially conforms to the near field communications wireless charging specification.
72. The wearable electronic device charging system of clause 71 wherein the at least one interior cut is a selected one of:
    one interior cut;
    two interior cuts;
    three interior cuts; and
    four interior cuts.
73. The wearable electronic device charging system of any of clauses 68-72 wherein the at least one interior cut is designed to reduce induced current circulation and inadvertent generation of a magnetic field contrary to a field used for the electromagnetic, inductive charging.
74. The wearable electronic device charging system of clause 68 wherein a two-turn coil is formed from the exterior band and the interior band by joining a first side of the exterior band at the at least one exterior cut to the interior cut at a side opposite the first side with a conductive material, and joining a second side of the exterior band at the at least one exterior cut to the interior cut at a side opposite the second side with a conductive material.
75. The wearable device of any of clauses 68-74 wherein the wearable device is a ring.

DETAILED DESCRIPTION

The present patent describes a system for charging a wearable device that enables the exterior band of a ring-shaped wearable device to itself act as a single-turn receiving coil for inductive charging when paired with a corresponding transmitting coil. In this way, there is no need to "center" or otherwise locate an inductive charging coil on a charging base because the entirety of the exterior band of the ring is the receiving coil. A centering peg may better-position the exterior band over a coil, but placement is simple and need not be in any particular direction around a given rotation of the ring. Accordingly, the interior of such a ring need not include any locating outward protrusions or inward indentations designed to enable power transmission.

Likewise, the exterior of the ring may be effectively a single, uninterrupted surface, save for a single cut to cause the exterior band to be a single coil. This is more aesthetically pleasing than having an interrupted band or multiple cuts or cutouts for charging connections. And, the interior of the ring may likewise be substantially uniform across its surface, having only at least one cut. In this way, the present patent describes a unique system for charging that is simple and elegant.

Description of Apparatus

Referring now to FIG. 1, a wireless charging system 100 for a wearable device with the wearable device 102 being placed upon a charging dock 110 is shown.

The wearable device 102 includes an exterior band 104 and an interior band 106, separated by a non-conductive filler 105. The exterior band 104 is made of an electrically conductive material. Preferred materials for the exterior band 104 may be iron, steel (various alloys, including those combining steel with gold, copper, aluminum, titanium, platinum and palladium), nickel or cobalt. The interior band 106 may be made of electrically conductive and magnetically responsive materials, including the same material as the exterior band 104. In other cases, the interior band 106 may be made, entirely or in part, of a non-magnetically active and/or non-electrically-conductive material such as a plastic, an epoxy, a resin, aluminum, gold, copper, aluminum, platinum, palladium, etc. However, since it may be aesthetically preferable for a wearable device, such as wearable device 102 to appear uniform in its construction, it may be preferable to use the same material for the exterior band 104 and the interior band 106.

The non-conductive filler 105 is a material intentionally designed to be non-electrically conductive. In some cases, the non-conductive filler 105 may be compressible to enable interaction with the wearable device 102 from compression. The non-conductive filler 105 separates and joins the exterior band 104 and the interior band 106, thereby ensuring that no electrical conductivity passed between the exterior band 104 and the interior band 106.

The interior space formed between the exterior and interior bands may be effectively hollow to house electronic components (e.g. sensors, batteries, processors, memory, etc.) or may be semi-hollow (hollow in portions, filled with compressible material in others) or may be filled with a compressible non-conductive material such as an oil-based gel or similar material such that the interior band and exterior band may be compressed such that they are closer together, but may not fully touch (which may cause damage to any electronics disposed within the interior space). A gel-like material may provide resistance to compression of varying levels but may provide feedback as the interior band and exterior band are pressed together.

Other types of wearable devices, include, but are not limited to, bracelets, watch bands and bezels, earrings, necklaces, earbuds or other headphones, eyeglasses themselves or their components (e.g. hinges, stems, frames), heart rate monitors, chest straps, and other, similar, wearable devices. The implementation of the processes described herein may vary dependent upon the type of wearable device in which they are placed.

In addition, the same non-conductive filler 105 (or another non-conductive filler) is placed in a cut 108 in the exterior band 104, thereby forming a break in the otherwise wholly-circular exterior band 104. Likewise, the same non-conductive filler 105 (or another non-conductive filler) is placed within a cut 107 in the interior band 106, thereby forming a break in the otherwise wholly-circular interior band 106. As a result, neither the exterior band 104 nor the interior band 106 forms a complete circle of electrically conductive and/or magnetically responsive material. In this way, and as discussed more fully below, the exterior band (or in some cases the interior band) forms a single-turn coil suitable for use in inductive wireless, electromagnetic charging when placed upon a suitable transmitting coil.

The charging dock 110 is a base formed for enclosing and providing power to energize an inductive wireless charging transmitting coil 112. In FIG. 1, the wearable device 102 is a ring and it is in the process of being placed upon the charging dock 110. The charging dock 110 may be a stand, an ordinary charging "puck" typically used in wireless charging, or a charging system (see FIGS. 6 & 7) specially-designed for the wearable device.

When the wearable device 102 is placed upon the charging dock 110, over the transmitting coil 112, the exterior band 104 (or in some cases the interior band 106) operates as a single-turn receiving coil. Suitable wireless charging control systems, embedded within the ring, receive an electromagnetic, induced charge and convert that into current for use in charging one or more batteries present within the wearable device 102.

Figure 2:
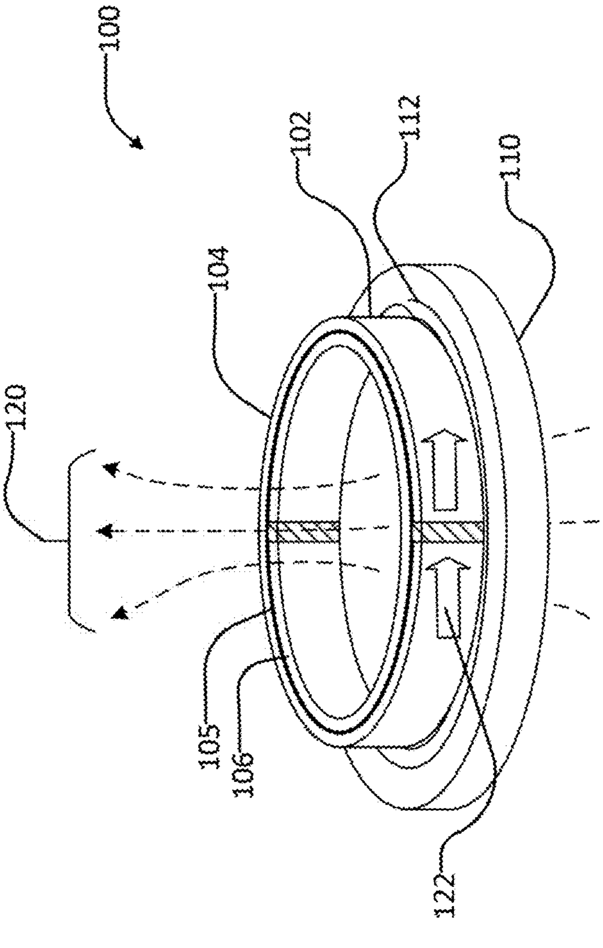
FIG. 2 is a wireless charging system for a wearable device with the wearable device placed upon a charging dock.

FIG. 2 is a wireless charging system 100 for a wearable device with the wearable device 102 placed upon a charging dock 110. Here, all of the same elements are present as in FIG. 1. None will be described herein again. Once the wearable device 102 is placed on the charging dock 110, an electromagnetic field 120 is generated passing upward (as shown in FIG. 2, though downward is possible as well) through the center of the wearable device 102 and around the exterior of the wearable device 102. The electromagnetic field 120 is generated by the transmitting coil 112 interacting with the exterior band 104 (and in some cases it may instead interact with the interior band 106) acting as a low-efficiency, single-turn receiving coil to generate a very low current 122 (between 0.5 and 2 watts transmitted, between 0.01 and 0.20 watts received) in the exterior band. That current may be connected at each end, near the cut 108 (FIG. 1) to a charge controller (not shown) to capture inductive charging current and provide that charge to batteries (not shown) internal to the wearable device 102.

Various forms of inductive charging exist. The most well-known are the Qi® wireless charging standard and the standard used by Apple® which is Qi® compliant, but stands on its own. Another is the near field communication (NFC) charging standard, put forward and maintained by the NFC Forum, a wireless consortium engaged in the standardization of near field communications protocols and standards and which as recently added a low-power wireless charging capability to its existing communications capabilities. NFC charging has a maximum output of approximately 1 watt. The use of a single-turn (or, as discussed later, a two-turn) receiving coil results in very low efficiency for the connected charging (approximately 2% to 20%), but the batteries used in ring-sized wearable devices are so small (between 2 and 20 mAh) that even extremely inefficient charging at less than 0.1 watt can still charge such a small battery in an hour to two hours. So, while there is significant loss of power due to the extremely small (one turn) receiving coil created by the cut 108 in the exterior band 106, this efficiency is still more than sufficient to charge batteries of such small size relatively quickly.

Figure 3:
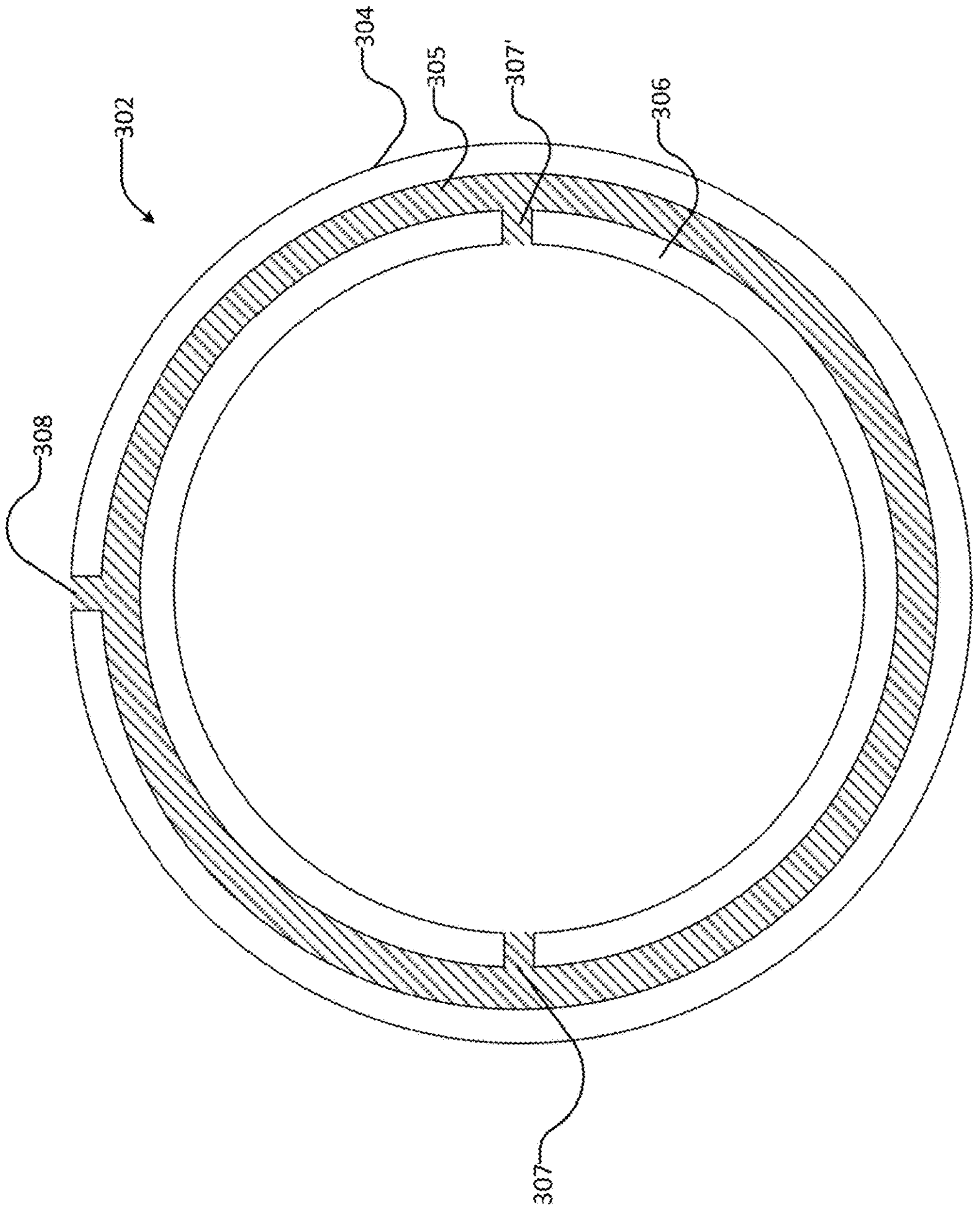
FIG. 3 is a cross-section of a wearable device including a single-turn receiving coil suitable for wireless charging.

FIG. 3 is a cross-section of a wearable device 302 including a single-turn receiving coil suitable for wireless charging. As discussed above, the single-turn receiving coil is the exterior band 304. The cut 308, filled with non-conductive filler 305 enables the exterior band 304, made of a magnetically-reactive material, to respond to the electromagnetic field through its center to generate a very low current. When conductors are connected to each of the ends of the wearable device 302, near the cut 308, current will move from one end to the other, thereby generating charge which a charge controller (not shown) can pass to batteries (not shown) thereby charging the wearable device 302.

The non-conductive filler 305 filling the cut 308 ensures that the single-turn receiving coil functions, albeit very inefficiently. The non-conductive filler 305 filling the cuts 307, 307' ensure that the interior band 306 does not generate its own magnetic field counteracting the inductive charging taking place using the exterior band 304. Only a single cut is required to ensure that no counter-acting magnetic field appears, but more cuts may further degrade any extremely weak magnetic fields along the lengths of the interior band 306 pieces. So, additional cuts may be beneficial and increase efficiency of the single-turn coil formed by the exterior band 304.

Figure 4A:
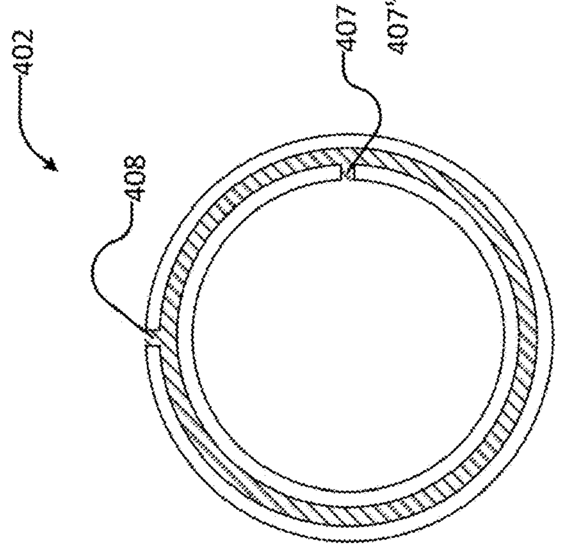
FIGS. 4A, 4B, and 4C are cross-sections of alternative wearable devices suitable for wireless charging.
Figure 4B:
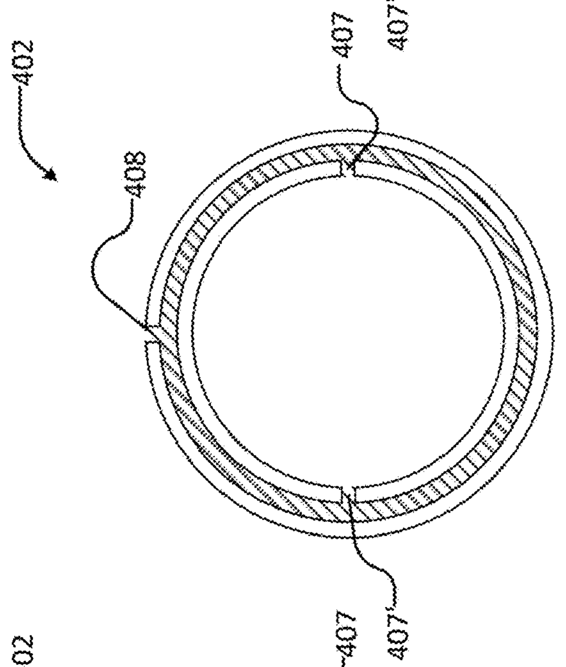
Figure 4C:
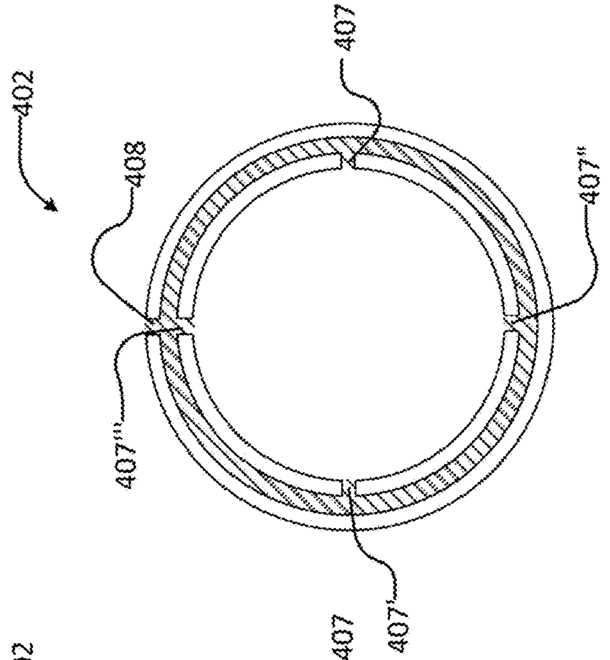

Turning to FIGS. 4A, 4B, and 4C, several cross-sections of alternative wearable devices 402 suitable for wireless charging are shown. Each of these FIGs. has different variations in the number of cuts. FIG. 4A has a cut 408 in the exterior band and a single cut 407 in the interior band. FIG. 4B has two cuts 407, 407' in the interior band, while still having a single cut in the exterior band 408. There are no additional cuts in the exterior band because that would further weaken the effectiveness of the single-turn receiving coil created by the single cut 408.

In some cases, the exterior band and the interior band may swap places and functionality such that the interior band with a single cut operates as a single-turn receiving coil for inductive charging while the exterior band may incorporate one or more cuts to reduce countervailing magnetic field generation. The exterior band is preferrable to the interior band for having the single cut for aesthetic reasons. It is aesthetically preferrable to have as few cuts as possible in the exterior band so that it appears pleasant to a wearer and the public's eyes when being worn. In addition, the exterior band is slightly larger than the interior band cross-sectionally when placed flat upon a wireless charging transmitting coil, so the charge induced by the magnetic field is slightly larger than it would be on the smaller, interior band.

Finally, FIG. 4C shows an exterior band with a single cut 408, but the interior band has four cuts 407, 407', 407" and 407'". The magnetic field that may counteract the current induced on the exterior band in this four-cut is less than that of the interior bands shown in FIGS. 4A and 4B. Still more cuts or fewer cuts may be possible or preferrable, but in general, fewer cuts are preferred on whatever band, interior or exterior, for aesthetic reasons. So, a single cut may be the preferred number. The cuts may be offset from directly lining up with the cut in the exterior band so that the magnetic field operates differently on the respective coil(s).

Figure 5:
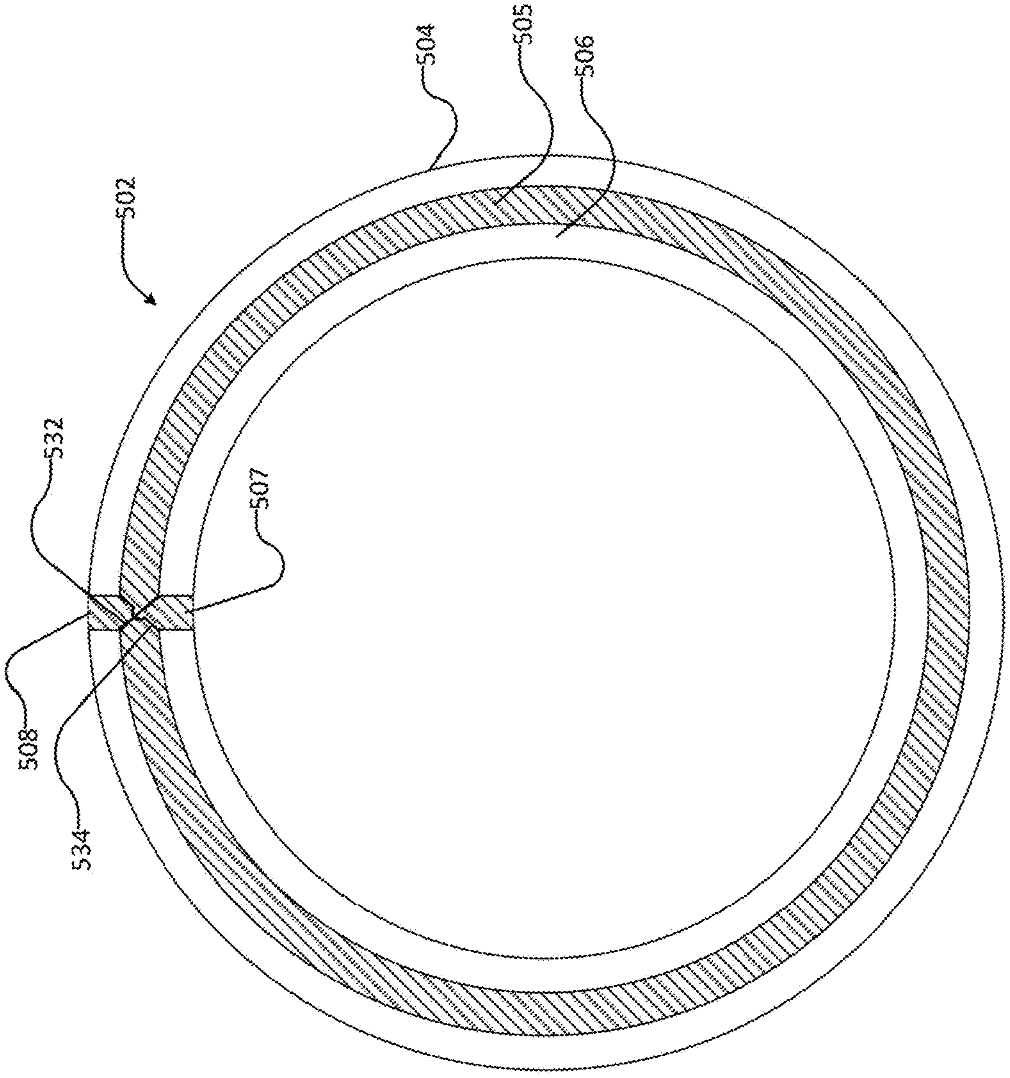
FIG. 5 is a cross-section of a wearable device having a two-turn receiving coil suitable for wireless charging.

FIG. 5 is a cross-section of a wearable device 502 having a two-turn receiving coil suitable for wireless charging. Here, the exterior band 504 and the interior band 506 both are separated by a non-conductive filler 505 which also fills cuts 508 and 507. The cuts 507, 508 are aligned on the exterior band 504 and interior band 506 so that electrically conductive material 532, 534 may join opposite corners of each band in a cris-crossed fashion, thereby forming a two-turn receiving coil. The electrically conductive material 532, 534 is preferably micro wiring, but may be built into a flexible printed circuit board or other micro conduit material. Because the exterior band 504 and interior band 506 form a two-turn coil, the efficiency of this design may increase more than linearly over the single-turn coil shown in, for example, FIG. 3. As above, a charge controller (not shown) may be joined to the interior and exterior bands at a point along their exterior (or near the cris-crossed conductive material 532, 534) to thereby add charge to batteries (not shown).

Although not shown, the interior band 506 may comprise of a plurality of thinner bands stacked atop one another and interconnected via electrically conductive material and separated by non-conductive material, so as to form a series of single-turn receiving coils. In this way, each plurality of thinner bands is separated and joined by the non-conductive filler and each having a single cut. Each end of the single cuts of each one of the plurality of thinner bands are interconnected via the electrically conductive material to form the series of receiving coils that are then connected to the charge controller and battery. In this way, the plurality of the thinner bands increases the number of single-turn receiving coils and thus increases the efficiency in charging of the wearable device. The exterior band may also be formed by a plurality of thinner bands stacked atop one another; however, for aesthetics, it is preferable that the interior band be formed by one or more thinner bands.

Figure 6:
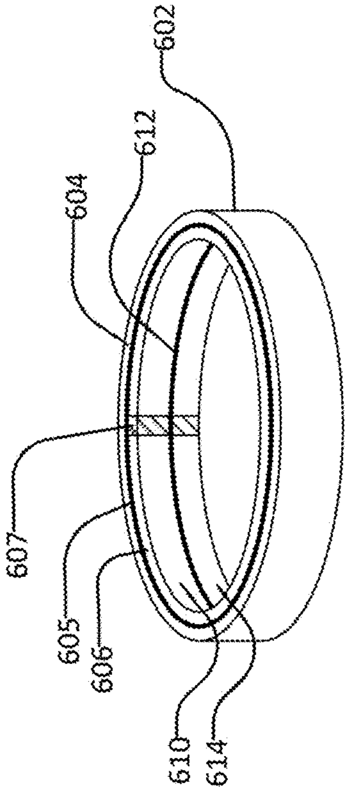
FIG. 6 is an example of an alternative design for a wearable device with integrated inductive charging.

FIG. 6 is an example of an alternative design for a wearable device 602 with integrated inductive charging. This wearable device is very much like the wearable device 102 of FIG. 1 The wearable device 602 includes an exterior band 604 and an interior band 606, separated by a non-conductive filler 605. The exterior band 604 is made of an electrically conductive material as with the wearable device 102 of FIG. 1.

This wearable device 602 has only a single cut 607 along the interior band 606, but also includes a circumferential cut 612 dividing an upper interior band 610 from a lower interior band 614. A single one of these interior bands 610, 614 may itself operate as an inductive charging coil when placed upon a suitable inductive wireless charging transmitting coil. Alternatively, the upper interior band 610 may be joined to the lower interior band 614 in a crossing pattern similar to that shown in FIG. 5 to thereby produce a two-turn inductive wireless charging coil that may increase the efficiency of the use of the interior band 606 for wireless charging.

Though FIG. 6 is shown as such a two-turn inductive wireless charging coil, any number of circumferential cuts may be made, each joined by a crossing pattern of wires internal to the wearable device 602 to thereby create a many-turn inductive wireless charging coil. In this way, the efficiency may be increased of the interior band 606 inductive charging coil formed by the various cuts without altering the exterior appearance of the wearable device 602 through any cuts in the exterior band 604.

This design may be preferable to other designs in FIGS. 1 through 5 because it results in an unbroken exterior band 604. It may be preferable for aesthetic reasons to have a single-surface, fully-unbroken exterior band 604, likely of a metal material. In addition, other materials may be suitable for such an exterior band 604, including ones that are not necessarily electrically conductive. This design renders the material choice for the exterior band 604 immaterial to the ability of the wearable device 602 to inductively charge.

Figure 7:
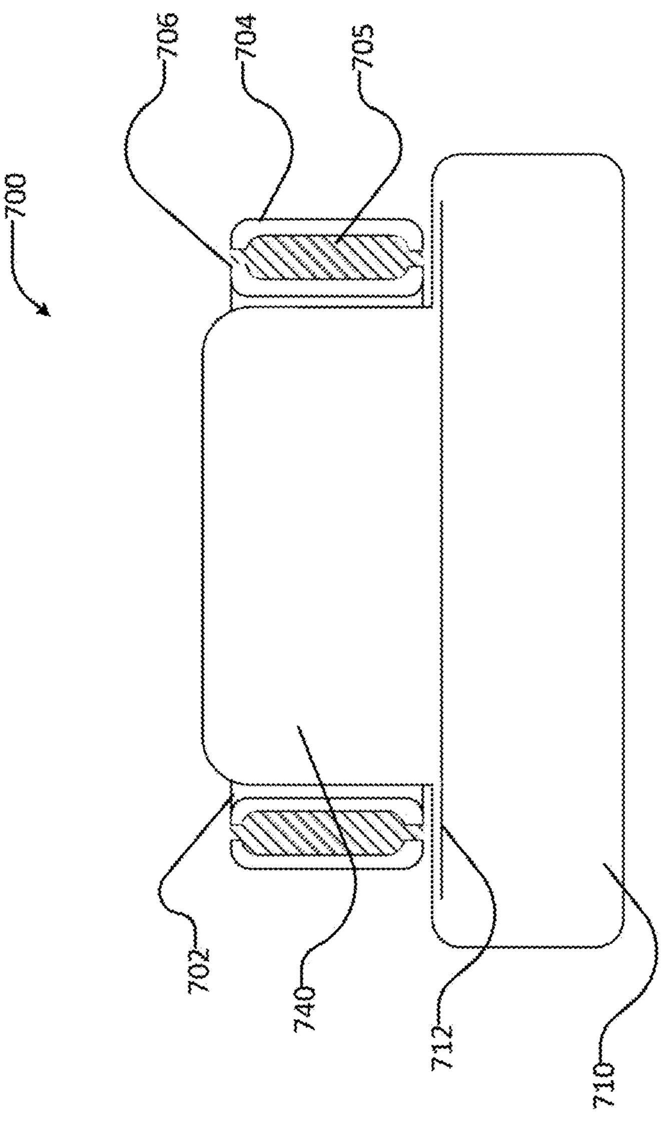
FIG. 7 is a cross-section of a wireless charging system for a wearable device with the wearable device placed upon a locating peg forming a part of a charging dock.

FIG. 7 is a cross-section of a wireless charging system 700 for a wearable device 702 with the wearable device placed upon a locating peg 740 forming a part of a charging dock 710. The wearable device 702 still includes the outer band 704, the inner band 706 and a cavity into which a non-conductive filler 705 is placed.

A locating peg 740 may assist a user in placing the wearable device 702 onto the charging dock 710 such that the inductive wireless charging transmitting coil 712 is in a suitable position to generate an electromagnetic field through the center of the single-turn coil formed by the cut in the exterior band 704 to enable the wearable device 702 to charge. Unlike the prior art, because the single-turn coil is formed from the exterior band of the wearable device itself, alignment of an inductive transmitting and receiving coils is not necessary. For example, the prior art typically requires a mating notch or nodule on both the charging dock and wearable device requiring that the mating notches or nodules make a connection when the two are engaged in order to charge the wearable device. Without the proper mating of the notches or nodules, the wearable device in the prior art cannot charge. The locating peg 740 itself will enable the wearable device 702 to charge no matter the orientation or placement, so long as it is placed on the locating peg 740. In some cases, no locating peg (e.g. FIGS. 1 & 2) may not be present at all, so long as the wearable device 702 is placed on a wireless, inductive charging transmitting coil 712, then charging will take place. But, it may be preferable to include a locating peg 740 to ensure proper alignment of the single-turn receiving coil (or two-turn shown in FIG. 5) formed by the exterior band and the transmitting coil 712.

Figure 8:
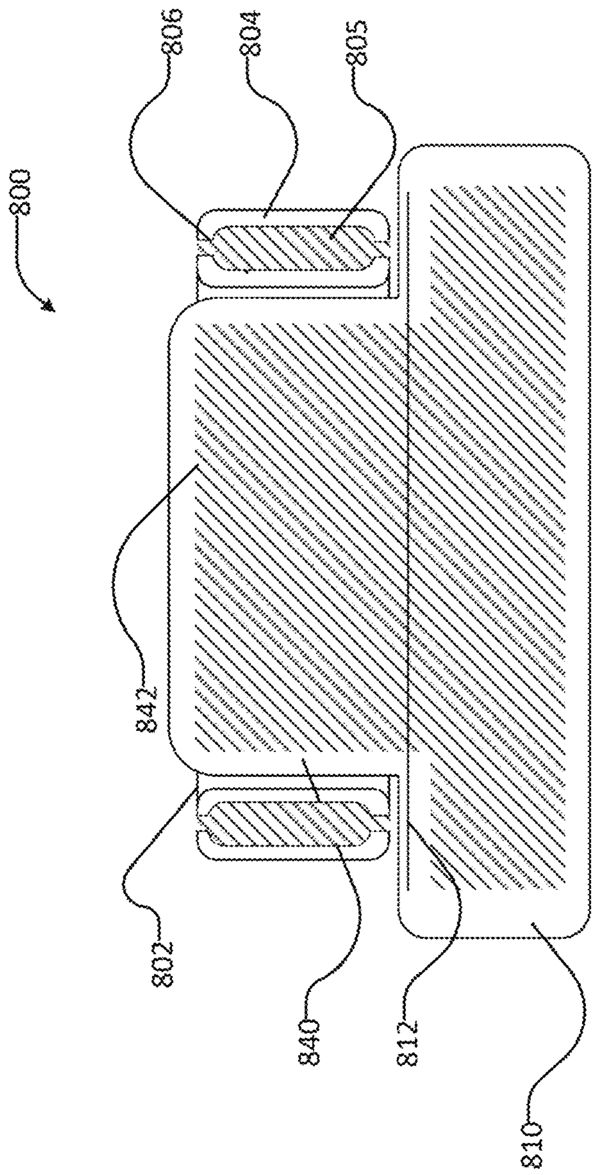
FIG. 8 is a cross-section of a wireless charging system for a wearable device with the wearable device placed upon a locating peg including a metallic core, each forming a part of a charging dock.

FIG. 8 is a cross-section of a wireless charging system 800 for a wearable device 802 with the wearable device placed upon a locating peg 840 including a metallic core 842, each forming a part of a charging dock 810. The discussion of this dock 810 is identical to that shown in FIG. 7, so the elements 804, 805, 806, and 812 have the same functions discussed therein as in the discussion with reference to FIG. 7 (using element numbers beginning with a 7) will not be repeated.

Here, the primary addition is the metallic core 842 which is a magnetically reactive material (e.g. iron, steel, cobalt, nickel) suitable to shape the magnetic field in and through the center of the wearable device 802 mounted on the locating peg 840 to thereby increase efficiency of and, thereby, power delivery to the single-turn receiving coil (or two-turn, as shown in FIG. 5). When the magnetic field is adequately shaped by magnetically-responsive materials in the high permeability core, the efficiency of the charging of the wearable device 802 is correspondingly increased. And, the charging dock 810 may be a bit heavier as a result, which will help to keep it in place upon a desk or other location where the charger is placed.

Description of Processes

Figure 9:
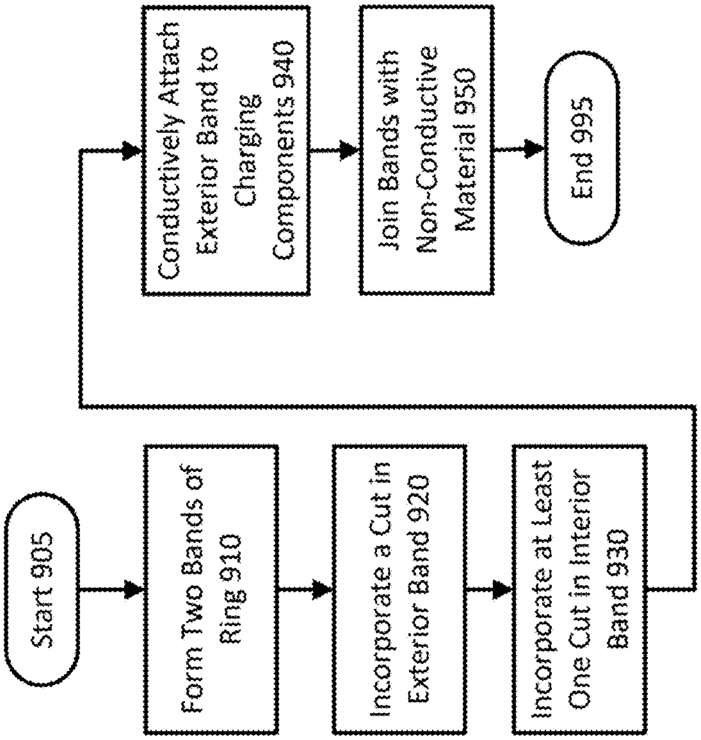
FIG. 9 is a method for manufacturing of a wearable device including a single-turn or two-turn receiving coil suitable for wireless charging.

FIG. 9 is a method for manufacturing of a wearable device including a single-turn or two-turn receiving coil suitable for wireless charging. The process has a start 905 and an end 995, but may take place for every instance of creation of a wearable device.

Following the start at 905, the process begins with forming two halves of the ring at 910. Here, the exterior band and interior band are formed of electrically-conductive material. At least the exterior band (or the interior band if it is used for charging instead) is formed of magnetically-reactive material as well so that it may later respond to magnetic flux through the center of a single-turn receiving coil (or double-turn coil in the example shown in FIG. 5) made up by the exterior band.

Next, a single cut is incorporated into the exterior band at 920. This cut enables the exterior band (or interior band in an alternative configuration where the interior band forms the single-turn receiving coil) to function as a single-turn receiving coil when electrically isolated from an opposite side.

Next, at least one cut is incorporated into the interior band at 930. This may be the exterior band in configurations with the interior band operating as the single-turn receiving coil. But, these cuts assist in reducing countervailing magnetic field generation that may counteract the inductive charging capabilities of the exterior band operating in response to magnetic flux through the center of the wearable device.

Next, the two ends of the exterior band are conductively attached to charging components at 940. Here, the two ends (nearest the cut) are joined to a charge controller which is in turn electrically joined to the battery of the wearable device to enable charging to occur when inductive charging acts upon the exterior band.

Finally, the two bands are joined together using non-conductive materials at 950. This joining together may encase various wearable device electronic components fixed within (between) the two bands while also electrically isolating the exterior band from the interior band. This enables the exterior band to continue to function as a single-turn receiving coil.

The process then ends at 995.

Figure 10:
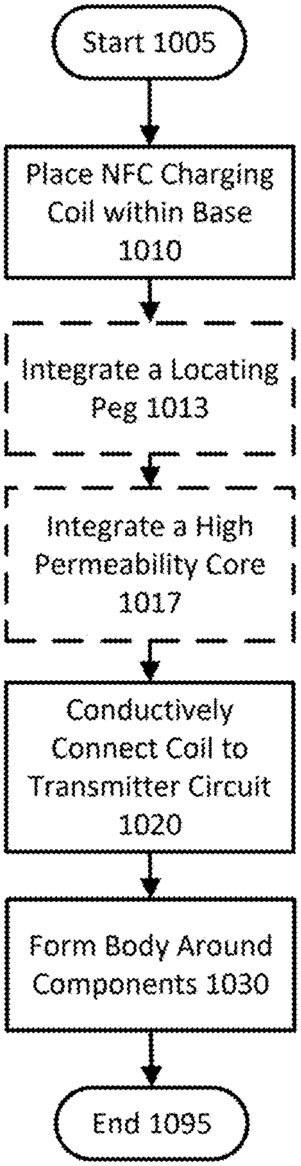
FIG. 10 is a method for manufacturing a charging dock.

FIG. 10 is a method for manufacturing a charging dock. The process has a start 1005 and an end 1095, but may take place for every instance of creation of a charging dock.

Following the start 1005, the process begins with placement of an NFC charging coil within the base at 1010. Here, a charging coil (transmitting coil) is added to the base of a charging dock. Suitable charge control systems will also be incorporated to enable the transmitting coil to function and, as in some cases, to negotiate charging with compatible devices such as a wearable device as described herein. Although NFC charging is preferrable, other inductive and wireless charging standards may be suitable and possible to be used instead.

An optional step 1013 includes integrating a locating peg into the charging dock. Although a locating peg is not required, it may be desirable in some cases. This peg may be integral with the charging dock base which incorporates the NFC charging coil. Meaning, the peg itself may be formed of the same material, injection molded or otherwise manufactured, as the charging base itself.

Next, a high permeability core is integrated at optional step 1017. Again, a high permeability core is metallic (see FIG. 8) and serves to shape and enable better transmission of the electromagnetic field generated by the wireless transmitting coil. This metallic core may be placed below and within the locating peg and base itself.

Next, the transmitter circuit is conductively connected to the transmitting coil at 1020. This step enables the transmitting coil to function to generate magnetic field that is used to induce charging in the target receiving device (e.g. the wearable device). The transmitter circuit may include charge controller that enables communication with the device to be charged (e.g. NFC communication) to negotiate a charge session and the associated parameters. But, the transmitter circuit enables the charging dock to function to charge.

Finally, the body is formed around the other components of the charging dock at 1030. Here, the electronic components responsible for powering and managing the connection of the wireless transmitting coil and receiving power from a wall outlet (e.g. a transformer, etc.) may be encased within the charging dock. This encasement typically involves welding or snapping together injection molded components around the associated printed circuit board and other components used to manage and control the charging dock. Once this is complete, the charging dock is finished and ready to charge a wearable device as described herein.

The process thereafter ends at 1095.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A wearable device comprising:

an exterior band comprised of an electrically conductive material, is an exterior surface of the wearable device, and includes at least one exterior cut through the entirety of the exterior band thereby forming a coil for electromagnetic, inductive charging;

an interior band; and the exterior band and interior band joined and separated from one another by a non-conductive material.

2. The wearable device of claim 1 wherein the interior band further includes a circumferential interior cut.

3. The wearable device of claim 1 wherein the coil may interact with an electromagnetic field to enable inductive charging of a battery housed within the wearable device.

4. The wearable device of claim 3, wherein the coil is conductively connected to a charge controller and the battery to receive an electromagnetic inductive current through the center of the wearable device and to thereby direct charging of the battery under the control of the charge controller.

5. The wearable device of claim 3 wherein the inductive charging substantially conforms to the near field communications wireless charging specification.

6. The wearable device of claim 1 wherein the at least one interior cut is a selected one of:

one interior cut;

two interior cuts;

three interior cuts; and four interior cuts.

7. The wearable device of claim 6 wherein the at least one interior cut is designed to reduce induced current circulation and inadvertent generation of a magnetic field contrary to a field used for the electromagnetic, inductive charging.

8. A wearable device comprising:

an exterior band;

an interior band, comprised of an electrically conductive material, and including at least one interior cut through the entirety of the interior band, the interior band, being an exterior surface of the wearable device, is a coil for electromagnetic, inductive charging; and the exterior band and interior band joined and separated from one another by a non-conductive material.

9. A wearable device comprising:

an exterior band, comprised of an electrically conductive material, and including one exterior cut through the entirety of the exterior band;

an interior band, comprised of an electrically conductive material, and including one interior cut through the entirety of the interior band; and forming a two-turn coil from the exterior band and the interior band by joining a first side of the exterior band at the one exterior cut to the interior cut at a side opposite the first side with a conductive material, and joining a second side of the exterior band at the one exterior cut to the interior cut at a side opposite the second side with a conductive material.

10. The wearable device of claim 9 wherein the two-turn coil may interact with electromagnetic fields to enable inductive charging of a battery within the wearable device.

11. The wearable device of claim 9 wherein the wearable device is a ring.

12. A wearable electronic device charging system comprising a wearable device in the form of a ring, the ring comprising:

an exterior band;

an interior band, comprised of an electrically conductive material, the interior band being an exterior surface of the ring, and including at least one interior cut through the entirety of the interior band is a receiving coil for electromagnetic, inductive charging;

a non-conductive material electrically isolating the exterior band from the interior band and joining the exterior band and interior band to thereby form the ring.

13. The wearable electronic device charging system of claim 12 further comprising:

a charging dock incorporating a transmitting coil for inducing an electromagnetic field for inductive charging of the wearable device.

14. The wearable electronic device charging system of claim 13 wherein the charging dock further comprises an alignment peg over which the ring may be placed to position the ring above the transmitting coil to enable the inductive charging of the wearable device to take place.

15. The wearable electronic device charging system of claim 14 wherein the at least one interior cut is a circumferential interior cut.

16. The wearable electronic device of claim 12 wherein the receiving coil includes multiple turns, each formed by circumferential cuts along the entirety of in the interior band to create multiple near-complete circles, terminated at the at least one interior cut.

17. The wearable electronic device of claim 12 wherein the coil may interact with an electromagnetic field to enable inductive charging of a battery housed within the wearable device.

18. The wearable electronic device charging system of claim 12 wherein a two-turn coil is formed from the exterior band and the interior band by joining a first side of the exterior band at an at least one exterior cut to the interior cut at a side opposite the first side with a conductive material, and joining a second side of the exterior band at the at least one exterior cut to the interior cut at a side opposite the second side with a conductive material.

19. The wearable electronic device of claim 13 wherein the wearable device is a ring.

* * * * *